(12) United States Patent
Jakkula et al.

(10) Patent No.: US 8,187,344 B2
(45) Date of Patent: May 29, 2012

(54) FUEL COMPOSITION FOR A DIESEL ENGINE

(75) Inventors: Juha Jakkula, Kerava (FI); Pekka Aalto, Porvoo (FI); Vesa Niemi, Porvoo (FI); Ulla Kiiski, Hamari (FI); Jouko Nikkonen, Hamari (FI); Seppo Mikkonen, Porvoo (FI); Outi Piirainen, Helsinki (FI)

(73) Assignee: Neste Oil Oyj, Espoo (FI)

( * ) Notice: Subject to any disclaimer, the term of this patent is extended or adjusted under 35 U.S.C. 154(b) by 686 days.

(21) Appl. No.: 12/354,634

(22) Filed: Jan. 15, 2009

(65) Prior Publication Data

US 2009/0126261 A1 May 21, 2009

Related U.S. Application Data

(62) Division of application No. 11/852,096, filed on Sep. 7, 2007, now abandoned, which is a division of application No. 10/655,798, filed on Sep. 5, 2003, now Pat. No. 7,279,018.

(60) Provisional application No. 60/408,302, filed on Sep. 6, 2002.

(51) Int. Cl.
C10L 1/10 (2006.01)
C10L 1/18 (2006.01)

(52) U.S. Cl. ............ 44/300; 44/388; 44/447; 44/451; 585/240; 585/733; 585/734

(58) Field of Classification Search .......... 44/300, 44/388, 447, 451; 585/240, 733, 734
See application file for complete search history.

(56) References Cited

U.S. PATENT DOCUMENTS

| | | | |
|---|---|---|---|
| 3,898,153 A | 8/1975 | Leuder et al. | |
| 3,929,615 A | 12/1975 | Linden et al. | |
| 4,300,009 A | 11/1981 | Haag et al. | |
| 4,960,960 A | 10/1990 | Harrison et al. | |
| 4,992,605 A | 2/1991 | Craig | |
| 5,092,908 A | 3/1992 | Feldman et al. | |
| 5,093,535 A | 3/1992 | Harrison et al. | |
| 5,158,982 A | 10/1992 | Stapp | |
| 5,183,556 A | 2/1993 | Reilly et al. | |
| 5,578,090 A | 11/1996 | Bradin | |
| 5,578,091 A | 11/1996 | Jackson et al. | |
| 5,705,722 A * | 1/1998 | Monnier et al. | 585/240 |
| 5,814,109 A | 9/1998 | Cook | |
| 5,861,441 A | 1/1999 | Waycuilis | |
| 5,882,505 A | 3/1999 | Wittenbrink et al. | |
| 5,888,376 A | 3/1999 | Wittenbrink et al. | |
| 5,906,729 A | 5/1999 | Chou | |
| 6,123,835 A | 9/2000 | Ackerson et al. | |
| 6,174,501 B1 | 1/2001 | Noureddini | |
| 6,982,155 B1 | 1/2006 | Fukuda et al. | |
| 2001/0027937 A1 | 10/2001 | Tsao et al. | |
| 2002/0027937 A1 | 3/2002 | Govorkov et al. | |
| 2007/0068848 A1 | 3/2007 | Monnier et al. | |

FOREIGN PATENT DOCUMENTS

| | | |
|---|---|---|
| CA | 1313200 | 1/1993 |
| CA | 2149685 | 12/1995 |
| CA | 2316141 | 2/2001 |
| CA | 2400944 | 8/2001 |
| CN | 1279663 A | 1/2001 |
| CZ | 283575 | 2/1998 |
| DE | 4116905 | 8/1992 |
| DE | 20113126 | 11/2001 |
| EP | 1396531 | 3/2004 |
| FI | 933982 | 9/1993 |
| FI | 95391 | 1/1996 |
| FI | SE9700149 | * 6/1997 |
| FR | 2607803 | 6/1988 |
| GB | 1002922 | 9/1965 |
| GB | 1524781 A | 9/1978 |
| GB | 2090611 | 7/1982 |
| IE | 921671 | 12/1995 |
| JP | 151914 | 8/1942 |
| JP | 2002/501570 T | 1/2002 |
| SE | 9700149 | 6/1997 |
| SE | 9700149 | 8/1997 |
| WO | WO 9203396 | 3/1992 |
| WO | WO-9216601 | 10/1992 |
| WO | WO 95/25152 | 9/1995 |
| WO | WO9525152 | * 9/1995 |
| WO | WO 98/56876 | 12/1998 |
| WO | WO-9856876 A1 | 12/1998 |
| WO | WO 99/26913 | 6/1999 |
| WO | WO 00/43335 | 7/2000 |
| WO | WO-0112581 | 2/2001 |

(Continued)

OTHER PUBLICATIONS

Wong, Al et al., "Conversion of vegetable oils and animal fats into paraffinic cetane enhancers for diesel fuels", Second Biomass Conference of the Americas: Energy, Environment, Agriculture, and Industry, Aug. 21-24, 1995, pp. 902-905.

(Continued)

*Primary Examiner* — Cephia D Toomer
(74) *Attorney, Agent, or Firm* — Finnegan, Henderson, Farabow, Garrett & Dunner, LLP

(57) ABSTRACT

The invention is directed to a fuel composition for diesel engines. The fuel composition comprises 0.1-99% by weight of a component or a mixture of components produced from biological raw material originating from plants and/or animals and/or fish. The fuel composition comprises 0-20% of components containing oxygen. Both components are mixed with diesel components based on crude oil and/or fractions from Fischer-Tropsch process.

20 Claims, No Drawings

FOREIGN PATENT DOCUMENTS

| WO | WO-01/38553 A1 | 5/2001 |
|---|---|---|
| WO | WO 01/49812 | 7/2001 |
| WO | WO 03/016442 | 2/2003 |
| WO | WO 03/022960 | 3/2003 |
| WO | WO-2007033460 | 3/2007 |

OTHER PUBLICATIONS

Office Action issued in co-pending Japanese Application JP-14988PCT on May 25, 2010.
Stumborg et al., "Hydroprocessed vegetable oilss for diesel fuels improvement", Bioresource Technology, vol. 56, 1996, pp. 13-18, Exhibit M of Request for Reexamination of U.S. Patent 7,279,018.
Request for Ex Parte Reexamination of U.S. Patent No. 7,279,018, including Image File Wrapper Exhibits A-M.
Speight, James G., "Petrpleum Chemistry and Refining", Taylor & Francis, Washington D.C., 1998.
Database WPI, Week 200357, Derwent Publication Ltd., AN 1997-488372 (Neste Oy), Abstract 1997.
Mochida, Isao et al. , "Two-stage hydrodenitrogenation of heavy distillate in a coal liquid", Fuel, May 1986, vol. 65, pp. 633-635.
Third Amendment After Final, Reexam Control No. 90/010,548, dated May 4, 2011.
Advisory Action, Reexam Control No. 90/010,548, dated Apr. 28, 2011.
Corrected Second Amendment After Final, Reexam Control No. 90/010,548, dated Apr. 22, 2011.
Interview Summary, Reexam Control No. 90/010,548, dated Apr. 14, 2011.
Advisory Action, Reexam Control No. 90/010,548, dated Apr. 8, 2011.
Amendment After Final, Reexam Control No. 90/010,548, dated Mar. 7, 2011.
Interview Summary, Reexam Control No. 90/010,548, dated Feb. 24, 2011.
Final Office Action, Reexam Control No. 90/010,548, dated Jan. 7, 2011.
Amendment, Reexam Control No. 90/010,548, dated Mar. 23, 2010.
Declaration of Dr. Csichery, Reexam Control No. 90/010,548, dated Mar. 20, 2010.
"Recognizing Deactivation Mechanisms in Paraffin Isomerizations," Catalyst Courier, 2006 Issue 64, pp. 10-12.
Declaration of P. Aalto with Exhibits, Reexam Control No. 90/010,548, dated Mar. 23, 2010.
Burch et al., "Melting Point Model of Alkanes," J. Chem. Eng. Data, 2004, vol. 49, pp. 858-863.
Office Action, Reexam Control No. 90/010,548, dated Oct. 23, 2009.
Order granting Request for Reexamination, Reexam Control No. 90/010,548, dated Jul. 16, 2009.
Bauldauf et al., "Processing of Vegetable Oil to Fiels in Mineral Oil Refinery Processes", VDE Reports, No. 1126 (1994) pp. 153-168.
Cecchi et al., "Conversion of Vegetable Oils Into Potential Fuels. Preliminary Trial.", Revue Fransaise Des Corps Gras, vol. 34, No. 9, Sep. 1987, pp. 397-104.
Gusmão, J. et al. "Utilization of vegetable oils as an alternative source for diesel-type fuel: hydrocracking on reduced Ni/SiO2 and sulphided Ni-Mo/γAl2O3," *Catalysis Today*, v. 5, p. 533-544, 1989.
Huve, "Shell Global Solutions Dewaxing Technologies & Catalysts Current Status,". pp. 1-13.
Nunes et al., "Soybean Oil Hydrocracking Under Pressure: Process and General Aspect of the Transformation", Revue De L'institut Fransais Du Petrole, vol. 42, No. 3, May-Jun. 1986.
Ribamar et al., "Vegetable Oil Catalytic Breakdown", Petrobras Technical Bulletin, Rio de Janeiro, 24 (2): 139-147, Apr./Jun. 1981.
Ribamar et al.. "Catalytic Decomposition of Vegetable Oil", Applied Catalysis, vol. 5, 1993, pp. 299-308.
The Order Granting Reexam dated Feb. 13, 2008 issued in U.S. Patent No. 7,232,935, now Control No. 90/008,899.
The Response dated Apr. 9, 2009 to the Office Action dated Feb. 9, 2009 filed in U.S. Patent No. 7,232,935, now Control No. 90/008,899.
The Office Action dated Feb. 9, 2009 issued in U.S. Patent No. 7,232,935, now Control No. 90/008,899.
The Statement of Substance of Interview dated May 14, 2009 filed in U.S. Patent No. 7,232,935, now Control No. 90/008,899.
The Proposed Agenda for Interview of Apr. 14, 2009 dated Apr. 9, 2009 filed in U.S. Patent No. 7,232,935, now Control No. 90/008,899.
The Request for Ex Parte Rexexam dated Nov. 7, 2007 filed in U.S. Patent No. 7,232,935.
The Preliminary Amendment dated Sep. 5, 2003 filed in U.S. Patent No. 7,232,935.
The Office Action dated Aug. 22, 2006 issued in U.S. Patent No. 7,232,935.
The Amendment dated Dec. 22, 2006 issued in U.S. Patent No. 7,232,935.
The Notice of Allowance dated Jan. 23, 2007 issued in U.S. Patent No. 7,232,935.
The Petition to make special dated Sep. 22, 2003 filed in U.S. Patent No. 7,279,018.
The Office Action dated Oct. 5, 2004 issued in U.S. Patent No. 7,279,018.
The Response to Office Action of Oct. 5, 2004 dated Mar. 7, 2005 filed in U.S. Patent No. 7,279,018.
The Office Action dated Jun. 1, 2005 issued in U.S. Patent No. 7,279,018.
The Response to Office Action of Jun. 1, 2005 dated Dec. 1, 2005 filed in U.S. Patent No. 7,279,018.
The Advisory Action dated Dec. 20, 2005 issued in U.S. Patent No. 7,279,018.
The Declaration of Dr. Ari Juva dated Nov. 28, 2005 filed in U.S. Patent No. 7,279,018.
The Supplemental Response to the Office Action of Jun. 1, 2005 dated Mar. 1, 2006 filed in U.S. Patent No. 7,279,018.
The Office Action dated May 17, 2006 issued in U.S. Patent No. 7,279,018.
The Response to the Office Action of May 17, 2006 dated Sep. 18, 2006 filed in U.S. Patent No. 7,279,018.
The Office Action dated Dec. 18, 2006 issued in U.S. Patent No. 7,279,018.
The Summary of Interview of Feb. 13, 2007 dated Feb. 22, 2007 issued in U.S. Patent No. 7,279,018.
The Response to the Office Action of Dec. 18, 2006 dated Mar. 19, 2007 filed in U.S. Patent No. 7,279,018.
Office Action issued in U.S. Appl. No. 11/852,096 on Jun. 24, 2010.
Kirk-Othmer; Encyclopedia of Chemical Technology; 3rd Ed, vol. 11, pp. 682-689, and vol. 9, pp. 804-805, published 1980.
Laz'yan et al; *Production of low-pour diesel fuels by hydroisomerisation of middle distillates from eastern medium-sulfur crudes*; Chemistry and Technology of Fuels and Oils; vol. 9, No. 9, pp. 684-688; Sep. 1973, published 1973.
Sharma and Olson; *Conversion of Fatty Acids and Esters to Low-Aromatic Gasoline*; American Chemical Society, Division of Fuel Chemistry (1994), 34 (4), 1040-2, published 1994.
Appeal Brief and Exhibits, Reexam Control No. 90/010,549, dated Jul. 6, 2011.
Exhibits to Appeal Brief, Reexam Control No. 90/010,549, dated Jul. 6, 2011.
Advisory Action, Reexam Control No. 90/010,549, dated Jun. 21, 2011.
Examiner's Answer, Reexam Control No. 90/010,549, dated Aug. 12, 2011.
Reply Brief, Reexam Control No. 90/010,549, dated Oct. 11, 2011.
Board Decision, Reexam Control No. 90/010,549, dated Mar. 22, 2012.

\* cited by examiner

FUEL COMPOSITION FOR A DIESEL ENGINE

This application is a Divisional of co-pending application Ser. No. 11/852,096 filed on Sep. 7, 2007, and for which priority is claimed under 35 U.S.C. §120; and this application claims priority of application Ser. No. 10/655,798 filed on Sep. 5, 2003 for which priority is claimed under 35 U.S.C. §120; and this application claims priority of Application No. 60/408,302 filed on Sep. 6, 2002 under 35 U.S.C. §119; the entire content of each of which is hereby incorporated by reference.

TECHNICAL FIELD

The present invention relates to a fuel composition for diesel engines, comprising components based on vegetable oil and/or animal fat and/or fish oil, diesel components based on crude oil and/or fractions from Fischer-Tropsch process, and optionally components containing oxygen.

PRIOR ART

Currently used fuels for diesel engines mainly contain components from crude oil. The aim of the climate agreement of Kyoto is to eliminate detrimental influences due to human activities on the atmosphere, and thus on the climate. The EU has agreed on reducing emissions of carbon dioxide, methane and other greenhouse gases by eight percent until 2010, starting from the levels of 1990. One of the objects of the EU agricultural policy is to find uses for agricultural overproduction, and to increase the self-sufficiency for fuels. Accordingly, an EU directive is being prepared, demanding that at least two percent of the petrol and diesel fuel consumed in 2005 should be of biological origin. It is anticipated that one of the requirements of this directive is to increase the proportion of biocomponents to about six percent until 2010. The directive will be validated in all EU countries in the near future.

At the moment, the most common component of biological origin in fuels is rapeseed oil methyl ester, referred to as RME. RME is either used as such or as a mixture with fuels. Drawbacks of RME are its poor miscibility with diesel fuels, and, in comparison to a conventional diesel fuel (EN 590), particularly under low temperature conditions, its poor storage stability and poor performance at low temperatures. Moreover, it causes engine fouling and increases emissions of nitrogen oxides (NOx). A by-product of the production process of RME is glycerol, which may become a problem when high amounts of the product are produced-Esters of other vegetable oils may be produced in similar manner, and methyl esters of fatty acids are generally known as FAMEs (fatty acid methyl ester). These FAMEs may be used in similar applications as the rapeseed oil methyl ester, but they also have a negative effect on the quality of the diesel fuel, particularly with respect to the performance thereof at low temperatures, and in addition, the use thereof in fuels increases the emissions of nitrogen oxides. In some cases FAME and RME cause higher particle emissions and smoke development of the cold driven engine.

Vegetable oils and animal fats may be processed to decompose the ester and/or fatty acid structure and to saturate the double bonds of the hydrocarbon chains, thus obtaining about 80 to 85% of n-paraffin product relative to the mass of the starting material. This product may be directly mixed with a diesel fuel, but a problem with the fuel so produced is its poor performance at low temperatures. In addition, n-paraffins having a carbon number of fatty acids are waxy with a high solidification point, typically above +10° C., thus limiting the use of these compounds in diesel fuels at least at low temperatures.

WO 2001049812 discloses a method for producing a diesel fuel with a molar ratio of iso-paraffins to n-paraffins of at least 21:1. In the method, a feed stock containing at least 50% of C10-paraffins is contacted with a catalyst in the isomerization reaction zone.

WO 2001012581 discloses a method for producing methyl esters useful as biological diesel fuel, wherein mixtures of fatty acids and triglycerides are esterified in one phase. In this method, a solution is formed from fatty acids, triglycerides, alcohol, acid catalyst and co-solvents at a temperature below the boiling point of the solution. A co-solvent is used in amounts to provide a single phase, then the solution is maintained for a period of time sufficient for the acid catalyzed esterification of the fatty acids to take place. Thereafter, the acid catalyst is neutralized, a base catalyst is added to transesterify the triglycerides, and finally, the esters are separated from the solution. Thus a biofuel containing esters is obtained, having a glycerol content of less than 0.4% by weight U.S. Pat. No. 6,174,501 presents a method for producing oxidized diesel fuel of biological origin. This oxidized biological diesel fuel comprises a mixture of transesterified triglycerides.

FI 100248 describes a two-step process for producing middle distillate from vegetable oil by hydrogenating fatty acids of the vegetable oil, or triglycerides, to give n-paraffins, and then by isomerizing the n-paraffins to give branched-chain paraffin-Any gases, liquid droplets and solid particles present in the atmosphere in amounts being hazardous to human health and/or having a detrimental effect on animals, plants and different materials, are considered as air pollutants. Air pollution mainly originates from three main emission sources, i.e., the industry, energy production, and traffic.

The harmfulness of particle emissions is caused by the substances and compounds they carry, such as heavy metals and other carcinogenic and mutagenic compounds. Particles present in exhaust gases are small and thus hazardous to health.

Greenhouse gases allow for the penetration of the radiation from the sun to reach the earth, preventing, however, the thermal radiation from escaping from the earth back to space. They thus contribute to the warming of the earth. One of the most significant greenhouse gases is carbon dioxide released, for instance, during the combustion of fossil fuels.

Nitrogen oxides are acidifying compounds. This acidification may, for instance, lead to plant damages and species changes in surface waters. Nitrogen oxides may also react with oxygen to give ozone. This phenomenon contributes particularly to air quality in cities.

As the above teachings indicate, there is a need for a high quality fuel composition for diesel engines containing components of biological origin and also meeting the quality requirements for diesel fuels under low temperature operation conditions. Moreover, the fuel should be more environmentally friendly than prior art solutions.

GENERAL DESCRIPTION OF THE INVENTION

The object of the invention is to provide a more environmentally friendly fuel composition for diesel engines containing components of biological origin, and also meeting the quality requirements for diesel fuels under low temperature conditions.

The fuel composition for diesel engines of the invention, containing components of biological origin, comprises at least one component produced from a biological starting material obtained from plants, animals or fish, diesel components based on crude oil and/or fractions from Fischer-Tropsch process, and optionally components containing oxygen.

The characteristic features of the fuel composition for diesel engines containing components of biological origin are presented in the appended claims.

DETAILED DESCRIPTION A OF THE INVENTION

It was surprisingly found that the diesel fuel composition of the invention, containing components of biological origin, also meets the quality requirements for diesel fuels under low temperature conditions. The composition of the diesel fuel of the invention comprises the following:

a) 0.1 to 99% by volume, preferably 0.1 to 80% by volume of a component or a mixture of components produced from biological raw material originating from plants and/or animals and/or fish;

b) 0 to 20% by volume of components containing oxygen selected from the group consisting of aliphatic alcohols such as methanol and ethanol, ethers, fatty acid esters such as methyl and ethyl esters, water, and mixtures containing the same; both components a) and b) being mixed as an emulsion or dissolved in diesel components based on crude oil and/or fractions from Fischer-Tropsch process.

Component a) produced from biological raw material originating from plants and/or animals and/or fish, referred to as the biological component in the present specification, is obtained by hydrogenating and decomposing fatty acids and/or fatty acid esters to give a hydrocarbon having a carbon number of 6-24, typically n-paraffin as the product having a carbon number of 12-24, and optionally by isomerizing the hydrocarbon, typically n-paraffin, thus obtained to give iso-paraffin. The hydrocarbon is preferably isomerized.

The biological raw material originating from plants and/or animals and/or fish is selected from the group consisting of vegetable oils, animal fats, fish oils and mixtures thereof containing fatty acids and/or fatty acid esters. Examples of suitable materials are wood-based and other plant-based fats and oils such as rapeseed oil, colza oil, canola oil, tall oil, sunflower oil, soybean oil, hempseed oil, olive oil, linseed oil, mustard oil, palm oil, peanut oil, castor oil, coconut oil, as well as fats contained in plants bred by means of gene manipulation, animal-based fats such as lard, tallow, train oil, and fats contained in milk, as well as recycled fats of the food industry and mixtures of the above.

The basic component of a typical vegetable or animal fat is triglyceride i.e., a triester of glycerol and three fatty acid molecules having the structure presented in the following formula I:

where R1, R2, and R3 are hydrocarbon chains, and R, R2, and R3 may be saturated or unsaturated C6-C24 alkyl groups. The fatty acid composition may vary considerably in biological raw materials of different origin.

n-paraffin, iso-paraffin or mixtures thereof produced from the biological raw material may be used as a diesel fuel component in accordance with the properties desired for the diesel fuel. Fractions from Fischer-Tropsch-process typically contain high levels of n-paraffin and, optionally, they may be isomerized either simultaneously during the processing of the

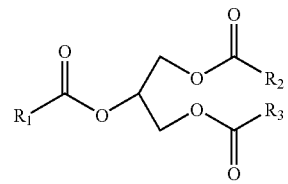

component of biological origin or separately therefrom, or they may be used as such.

The biological component may be produced, for instance, with a process comprising at least two steps and optionally utilizing the counter-current operation principle. In the first hydrodeoxygenation step of the process, optionally running counter-current, the structure of the biological raw material is broken, compounds containing oxygen, nitrogen, phosphor and sulphur as well as light hydrocarbons as gas are removed, and thereafter, olefinic bonds are hydrogenated. In the second isomerization step of the process, optionally running counter-current, isomerization is carried out to give branched hydrocarbon chains, thus improving the low temperature properties of the paraffin.

Biological raw material originating from plants, animals or fish and containing fatty acids and/or fatty acid esters, selected from vegetable oils, animal fats, fish oils and mixtures thereof, is used as the feed stock.

High quality hydrocarbon component of biological origin, particularly useful as a component of a diesel fuel, as an isoparaffinic solvent and as a lamp oil, is obtained as the product having a high cetane number that may even be higher than 70. Also, with a turbidity point lower than −30° C. a cetane number higher than 60 can still be achieved. The process can be adjusted according to the desired cetane number and turbidity point.

Advantages of the diesel fuel composition of the present invention include superior performance at low temperatures and an excellent cetane number compared to solutions of prior art using FAME-based components like RME. Problems associated with the performance at low temperatures may be avoided by isomerizing waxy n-paraffins having a carbon number comparable with that of fatty acids to give isoparaffins. The properties of the products thus obtained are excellent, especially with respect to diesel applications, the n-paraffins typically have cetane numbers higher than 70, and isoparaffins higher than 60, and thus they have an improving effect on the cetane number of the diesel pool, which clearly makes them more valuable as diesel components. Moreover, the turbidity point of the isomerized product may be adjusted to the desired level, for example below −30° C., whereas the corresponding value is about 0° C. for RME and more than +15° C. for n-paraffins. Table 1 below compares the properties of an isomerized biological component, RME, and a commercial diesel fuel.

TABLE 1

| Product | Density (kg/m$^3$) | Cetane number | Turbidity point (° C.) |
|---|---|---|---|
| Isomerized biological component | C 800 | >60 | −30 |
| RME | −880 | −50 | −0 |
| Diesel fuel EN 590 | 820-845 | >51 | 0 to −15 |

Fouling of engines is considerably diminished and the noise level is clearly lower when using the diesel fuel composition of the invention in comparison with similar prior art fuels of biological origin containing FAME components, and further, the density of the composition is lower. The composition does not require any modifications of the automobile technology or logistics. Higher energy content per unit volume may be mentioned as a further advantage compared to RME.

The properties of the diesel fuel composition of biological origin according to the invention correspond to those of a high quality diesel fuel based on crude oil, it is free of aromates and, in contrast to FAME, it leaves no impurity residues.

Nitrogen oxide emissions due to the fuel composition of the invention are lower that those from a similar FAME-based product, and further, the particle emissions are clearly lower, and the carbon portion of the particles is smaller. These significant improvements in the emissions of the fuel composition of biological origin are environmentally very important.

The invention will now be illustrated by means of the following examples without intending to limit the scope thereof.

EXAMPLES

Example 1

The following Table 2 compares the emission characteristics of a conventional diesel fuel used in Europe in summer, EN 590 (DI), to those of a composition containing 60% by volume of hydrogenated and isomerized tall oil (TOFA), and 40% by volume of the European summer diesel fuel EN 590.

TABLE 2

| Characteristic | Unit | 60% b.v. TOFA + 40% b.v. DI | DI |
|---|---|---|---|
| Turbidity point | ° C. | −15 | −8 |
| Cetane number |  | 61.2 | 55.9 |
| Aromates | % b.w. | 8.7 | 19.2 |
| Total aromates (IP391) | % b.v. | 9.1 | 20.0 |
| Polyaromates (1P391) | % b.v. | 0.8 | 1.6 |
| n-paraffins | % b.w. | 14.7 | 24.5 |
| i-paraffins | % b.w. | 34.2 | 26.1 |
| Naphtenes | % b.w. | 42.4 | 30.2 | b.w. = by weight
b.v. = by volume

Example 2

Table 3 below compares the emission characteristics of a high quality reformed crude oil based diesel fuel available on the Finnish market (DITC, produced by Fortum Oyj), to those of compositions containing 30% by volume of hydrogenated and isomerized tall oil (TOFA), and 70% by volume of DITC, or containing 30% by volume of tall oil methyl ester (MME), and 70% by volume of DITC.

TABLE 3

| Characteristic | Unit | DITC | 30% b.v. TOFA 70% b.v. DITC | 30% b.v. MME 70% b.v. DITC |
|---|---|---|---|---|
| Cetane number |  | 51 | 57 | 48 |
| NO, emissions (compared to DITC) | % |  | −1 to −4 | +3 |
| Particles | % |  | −3 | +22 |
| carbon | % |  | −10 to −30 | 0 to −10 |
| PAH | % |  | ±0 | ±0 |
| Combustion noise |  |  | decreases | ±0 | b.v. = by volume

The invention claimed is:

1. A composition for diesel fuel, wherein said composition consists of at least one component produced by a process comprising:
providing at least one biological raw material originating from animals, wherein said biological raw material contains fatty acids and/or fatty acid esters;
hydrogenating and decomposing said fatty acids and/or fatty acid esters to form hydrocarbons;
isomerizing said hydrocarbons to form isoparaffins; and
wherein said composition is free of aromates and has a cetane number higher than 60.

2. The composition according to claim 1, wherein said biological raw material is selected from fats, oils, and mixtures thereof.

3. The composition according to claim 1, wherein said biological raw material is selected from animal-based fats; fats contained in milk; recycled fats of the food industry and mixtures thereof.

4. The composition according to claim 1 having a turbidity point lower than −30° C.

5. The composition according to claim 1 having a density less than diesel.

6. A composition for diesel fuel, wherein said composition consists of at least one component produced by a process comprising:
providing at least one biological raw material originating from animals or from animals in combination with plants and/or fish, wherein said biological raw material contains fatty acids and/or fatty acid esters;
hydrogenating and decomposing said fatty acids and/or fatty acid esters to form hydrocarbons; and
isomerizing said hydrocarbons to form isoparaffins;
wherein said composition is free of aromates.

7. The composition according to claim 6, wherein said biological raw material is selected from fats, oils, and mixtures thereof.

8. The composition according to claim 6, wherein said biological raw material is selected from animal-based fats; fats contained in milk; recycled fats of the food industry; wood-based fats or oils; non-wood, plant-based fats or oils; fats contained in plants bred by means of gene manipulation; fish oils; and mixtures thereof.

9. The composition according to claim 6, wherein said biological raw material originates from a combination of animals and plants.

10. The composition according to claim 6 having a cetane number higher than 60.

11. The composition according to claim 6 having a turbidity point lower than −30° C.

12. The composition according to claim 6 having a density less than diesel.

13. A composition for diesel fuel, wherein said composition consists of:
a) at least one component produced by a process comprising:
providing at least one biological raw material originating from animals or from animals in combination with plants and/or fish, wherein said biological raw material contains fatty acids and/or fatty acid esters;
hydrogenating and decomposing said fatty acids and/or fatty acid esters to form hydrocarbons; and
isomerizing said hydrocarbons to form isoparaffins;
b) at least one component selected from aliphatic alcohols, ethers, fatty acid esters, water, and mixtures thereof;
wherein said composition is free of aromates.

14. The composition according to claim 13, wherein said biological raw material is selected from fats, oils, and mixtures thereof.

15. The composition according to claim 13, wherein said biological raw material is selected from animal-based fats; fats contained in milk; recycled fats of the food industry; wood-based fats or oils; non-wood, plant-based fats or oils; fats contained in plants bred by means of gene manipulation; fish oils; and mixtures thereof.

16. The composition according to claim 13, wherein said biological raw material originates from a combination of animals and plants.

17. The composition according to claim 13, wherein said biological raw material originates from a combination of animals, plants, and fish.

18. The composition according to claim 13, wherein said (a) component has a cetane number higher than 60.

19. The composition according to claim 13, wherein said (a) component has a turbidity point lower than −30° C.

20. The composition according to claim 13, wherein said (a) component has a density less than diesel.

* * * * *